United States Patent [19]

Needham

[11] Patent Number: 5,366,675
[45] Date of Patent: Nov. 22, 1994

[54] FOAMABLE POLYETHYLENE-BASED COMPOSITION FOR ROTATIONAL MOLDING

[76] Inventor: Donald G. Needham, Rte. 1, Box 300, Ramona, Okla. 74061

[21] Appl. No.: 204,855

[22] Filed: Mar. 2, 1994

[51] Int. Cl.⁵ .............................................. C08J 9/34
[52] U.S. Cl. ........................... 264/45.5; 264/310; 521/51; 521/134; 521/92
[58] Field of Search ............. 521/51, 134, 92; 264/310, 45.5

[56] References Cited

U.S. PATENT DOCUMENTS

| | | | |
|---|---|---|---|
| Re. 32,356 | 2/1987 | Cardarelli | 424/78 |
| 3,595,735 | 7/1971 | Tyrell | 161/162 |
| 3,784,668 | 1/1974 | Neidinger et al. | 264/310 |
| 3,876,613 | 4/1975 | Needham et al. | 260/45.85 |
| 3,974,114 | 8/1976 | Sowa | 264/310 |
| 4,032,600 | 6/1977 | MacAdams et al. | 264/310 |
| 4,107,354 | 8/1978 | Wilkenloh et al. | 427/118 |
| 4,110,269 | 8/1978 | Ehrenfreund | 521/81 |
| 4,267,080 | 5/1981 | Yokoyama et al. | 525/194 |
| 4,275,168 | 6/1981 | Watanabe et al. | 521/82 |
| 4,499,141 | 2/1985 | Paisley et al. | 521/134 |
| 4,507,405 | 3/1985 | Paisley et al. | 521/134 |
| 4,582,656 | 4/1986 | Hoffmann | 264/22 |
| 5,047,440 | 9/1991 | Wilson, Jr. | 521/88 |
| 5,063,095 | 11/1991 | Kitagawa et al. | 428/35.8 |
| 5,260,381 | 11/1993 | Needham | 525/193 |

*Primary Examiner*—Morton Foelak
*Attorney, Agent, or Firm*—Timothy R. Kroboth

[57] ABSTRACT

A foamable composition useful for rotational molding, is provided. The composition advantageously includes an ethylene vinyl ester copolymer as an additive. The additive beneficially has a higher melt index than the base resin of the composition.

20 Claims, No Drawings

FOAMABLE POLYETHYLENE-BASED COMPOSITION FOR ROTATIONAL MOLDING

FIELD OF THE INVENTION

This invention relates to thermoplastic polymers of ethylene suitable for fabrication into useful foamed products, by rotational molding.

BACKGROUND OF THE INVENTION

Rotational molding, more commonly known as rotomolding, is generally used for molding hollow articles such as outdoor sports equipment, storage tanks and refuse containers. To rotomold a part, powdered polyethylene or other plastic resin is placed inside a hollow mold, which is then closed and rotated on two axes, inside a heated oven to allow the powder to fuse together, forming a hollow mass inside of the mold. The mold is removed from the oven to cool, and after cooling, the molded part is removed. Thereafter, more powder is placed inside the mold to begin another cycle. A more detailed discussion of rotomolding may be found in *Modern Plastics Encyclopedia* 1990, pages 317-318.

Foaming agents are useful to improve appearance, reduce part weight, provide a higher insulation value, increase stiffness and reduce resin cost. Generally, foaming agents may be classified as "physical" or "chemical" foaming agents. Typically, physical foaming agents are normally gaseous at the temperature at which the plastic mass is to be foamed. Chemical foaming agents are typically compositions which decompose or react to form a gas. Heat decomposable, foaming agents include organic compounds such as azodicarbonamide, 4,4'-oxybisbenzenesulfonyl hydrazide, and p-toluenesulfonyl hydrazide; disadvantages include cost and unpleasant odor. Carbon dioxide-releasing, foaming agents include inorganic salts such as sodium, ammonium, and potassium bicarbonate. A foaming coagent is advantageously used with a reactive type, chemical foaming agent, and for an acid-released, foaming agent, a fatty acid such as stearic acid or a mild organic acid such as citric acid is often used as the coagent.

A useful additive when foaming thermoplastics is often a nucleating agent. A nucleating agent ensures uniform cell size and reduces the existence of surges and voids in the foam. Typically, a nucleating agent remains solid or is thermally stable during foaming, and is usually finely powdered. As exemplified by U.S. Pat. Nos. 4,107,354, 4,110,269 and 4,275,168, nucleating agents useful when foaming polyolefins include calcium carbonate; silica products; pigments; carbon black; and silicates such as kaolins, mica, talc, aluminum silicate, magnesium silicate, and calcium silicate.

As illustrated by U.S. Pat. Nos. 4,110,269, 4,275,168, 5,047,440, and Re. 32,356, ethylene vinyl acetate copolymer or ionomer resin based on ethylene vinyl acetate copolymer has been used with foaming agents to produce porous structures.

Despite advances in foamable compositions, there is a need for a foamable, polyolefin-based composition suited for rotomolding applications.

SUMMARY OF THE INVENTION

In accordance with the present invention, a foamable polyolefin-based composition and a method of processing the composition to produce hollow foamed articles, are provided. A polyethylene base resin is beneficially selected for use in the invention. The foamable composition advantageously includes a chemical foaming agent. When a bicarbonate salt is used as the foaming agent, a slightly acidic environment may be advantageously provided by a foaming coagent. Foaming is effected during rotomolding and is beneficially in the presence of a nucleating agent.

When a polymeric additive having a melt index higher than that of the polyolefin base resin is used, foamed hollow articles molded in accordance with this invention, advantageously exhibit a smooth outer skin.

DETAILED DESCRIPTION OF THE INVENTION

As indicated above, the present invention relates to a foamable polyolefin-based composition, and to a method of rotomolding hollow articles from the foamable composition. In accordance with the invention, foamed hollow articles of flexible or rigid structure can be made. These articles are particularly suited for insulating applications.

Polymers useful for this invention include thermoplastic polymers of ethylene. Polyethylene homopolymers, ethylene copolymers, and a mixture of both are particularly suitable. The olefin polymer used in this invention, may be an ethylene homopolymer or ethylene copolymer comprised of a major part of ethylene monomer. Typically at least about 75% by weight of ethylene monomer will be used. Useful monomers for a minor part of ethylene copolymer include a C3-C8 alpha-olefin, typically an acyclic straight or branched chain olefin such as butene.

Use of polyethylene homopolymer and of ethylene copolymer compositions for rotomolding applications, is well known, as illustrated in U.S. Pat. No. 3,876,613 to Needham. In these polyethylene base resins, a crosslinking agent is frequently incorporated. However, a crosslinking agent would usually not be beneficial in a foamable, polyolefin-based composition in accordance with the present invention.

Advantageously, a useful polyolefin base resin has a melt index of from about 1 to 10, preferably 2 to 8, gm/10 minutes as determined by ASTM D1238, condition "E". A highly useful range is from about 3 to 5 gm/10 minutes. A suitable density for the polyolefin base resin is typically in the range of about 0.92 to 0.96 gm/cc, as determined by the ASTM 1505 testing procedure. Foam articles of rigid structure may be molded from resins with a density of about 0.935 to 0.960 gm/cc; whereas, softer, more flexible articles may be molded from resins having a density of from about 0.920 to 0.935 gm/cc.

To create a smooth skin on the outside of a molded article, I have found that the foamable composition of the present invention beneficially includes a polymeric additive advantageously having a melt index above the melt index of the polyolefin base resin. Additionally, the polymeric additive advantageously is lower melting than the polyolefin base resin. As a result, the additive may beneficially melt and lay down to form an outer skin during rotomolding. In this regard therefore, the differential between the melt indices should be sufficient to achieve this result. Generally speaking, a melt index at least about 1.5 to 2 times that of the polyolefin base resin, will be adequate. Thus, the melt index of the polymeric additive will typically be in the range of from about 5 to 25, preferably 7 to 20, gm/10 minutes, with a highly useful range being from about 8 to 10 gm/10 minutes. Without the polymeric additive, the outer skin of the molded article may have a cellular foam structure and may have a rough surface.

Beneficially, the density of the polymeric additive is lower than that of the polyolefin base resin and the additive therefore melts at a lower temperature. In this respect, a suitable density of the additive, which is non-ionomeric, may generally be in the range of from about 0.90 to 0.94 gm/cc.

Advantageously, the additive is a flexible, resilient polymer such as an ester group-bearing, ethylenic polymer as exemplified by ethylene vinyl ester copolymer. Typically, vinyl ester content of a suitable ethylene vinyl ester copolymer may range from about 5 to 25, more particularly from about 7 to 15 percent. As may be seen from the examples that follow, an especially useful content is about 8 to 10 percent vinyl ester.

A suitable amount of the polymeric additive for use in the present invention depends upon factors including the particular product, desired outer skin thickness, the foaming agent to be used, the level of the foaming agent, and the degree of foaming desired. Thus, to increase the thickness of the outer skin, a relatively higher level of the polymeric additive should be used. Beneficially, about 0.5 to 7.5, preferably about 1 to 4, parts by weight of the polymeric additive is used. Although in some cases an even higher level may be used, considerations including those of cost may dictate otherwise.

When the additive is difficult to process as may be the case with an ester group-bearing, ethylenic polymer such as ethylene vinyl acetate copolymer, it may be beneficial to preblend the additive with a suitable carrier. To this end, the additive and carrier may be extrusion blended, pelletized and ground to provide a powder for rotomolding. In this respect, I have found that for instance, an about 1:1 ratio is useful for dispersing ethylene vinyl acetate copolymer in a polyolefin carrier. Suitability of a carrier resin is based upon for instance, comparative melt index, and compatibility with the polymeric additive and with the polyolefin base resin. Advantageously, a polyethylene homopolymer or ethylene copolymer composition having a higher melt index than the polymeric additive, may be chosen as the carrier resin. Generally speaking, the melt index of the carrier resin is at least about 1.5 to 2 times that of the additive. Thus, a useful melt index of the carrier resin may range from about 10 to 30, preferably from about 15 to 25, gm/10 minutes.

The foaming agent useful in the present invention, is beneficially a chemical foaming agent. Foaming may be advantageously provided when the thermoplastic mass being rotomolded is in a molten state. To this end, a gas-releasing, foaming agent should release gas at a temperature near the melting temperature of the polyolefin base resin; otherwise, if the release temperature is too high, the polyolefin base resin may have inadequate melt viscosity during foaming, and collapse of foam structure may result. A bicarbonate-based, inorganic salt is illustrative of a reactive type of chemical foaming agent that releases carbon dioxide during rotomolding; in comparison, azodicarbonamide has a high decomposition temperature of about 437° F. Useful bicarbonate foaming agents include salts of a Group 1A metal such as sodium, and sodium bicarbonate is a preferable foaming agent. Foaming agents may be used alone or in combination; thus, for example, sodium bicarbonate and potassium bicarbonate may be used together.

A foaming coagent providing for reactive release of gas, will be selected for use with a reactive type, chemical foaming agent. For an acid-released, foaming agent, the coagent may be a proton donor such as citric acid or otherwise serve as a proton source. Beneficially, I have found that an ester group-bearing, ethylenic polymer such as ethylene vinyl acetate copolymer, may apparently serve under rotomolding conditions as a proton source. Accordingly, I have found a sodium bicarbonate/ethylene vinyl acetate copolymer combination to be highly useful during rotomolding.

The amount of foaming agent to be used will vary depending upon factors including the foaming agent selected and the degree of foaming desired. Useful foam densities generally ranging from about 6 to 45 pounds per cubit foot may be obtained. Beneficially, at least about 0.1 part by weight, preferably about 0.3 to 2 parts by weight, of foaming agent may be used. If desired, up to about 3 or more parts of the foaming agent may be employed.

The amount of foaming coagent will similarly vary. Typically, the coagent will be used in slight excess relative to the amount of the foaming agent. Although an even higher level may be used if desired, cost considerations may dictate otherwise. In any event, sufficient coagent should be used to provide for release of gas from the foaming agent.

Also beneficially included in accordance with the present invention, is a nucleating agent. A suitable nucleating agent advantageously has a melting point in excess of the melting point of the polyolefin base resin or remains solid at the required molding temperature, and is typically of small particle size. Exemplary nucleating agents include calcium carbonate, carbon black, graphite, titanium dioxide, zinc oxide, iron oxide, silicates such as talc, and stearates such as calcium stearate. Materials such as zinc stearate which do not remain solid or thermally stable at the needed molding temperature, are typically not suitable.

The nucleating agent beneficially may increase the containing melt strength of the polyolefin base resin and provide for controlled cellular expansion. If the nucleating agent were omitted, foamed cells would usually overexpand and rupture, producing an unsatisfactory appearance and deformed or irregular shape.

Typically, the nucleating agent will have a particle size in the range of from about 0.05 to 50 microns, preferably about 0.1 to 25 microns. As may be understood, a finely powdered, nucleating agent will generally have a desirable effect on cell uniformity, size and distribution.

The amount of the nucleating agent to be used will vary depending upon factors including the foaming agent selected, the cell size desired, the particle size of the nucleating agent, and the foaming conditions. Generally speaking, a relatively smaller cell size may be obtained by use of a relatively higher level of the nucleating agent. Also, a relatively lower level of nucleating agent is usually needed when a relatively smaller particle size is used. Beneficially, at least about 0.01 to 2 parts by weight, preferably about 0.1 to 1 part by weight of the nucleating agent may be used, with a loading of about 0.1% being typically useful for particles of about 0.1 micron.

Other processing additives may be incorporated into the polyolefin base resin as needed. These processing aids may include anti-oxidants, UV stabilizers, pigments and anti-static agents.

In accordance with the invention, a foamable polyolefin-based composition as previously described, is rotomolded. To this end, the powder mixture is advantageously dry blended prior to rotomolding, to increase homogeneity using for instance, a conventional blending device such as a ribbon blender. Extrusion blending and pelletizing are beneficially avoided as premature foaming may result. Thereafter, the powder blend is placed inside a hollow mold, which is typically rotated on two axes inside a heated oven.

By the process, the powder blend is heated for a sufficient time and at a temperature adequate to melt the thermoplastic constituents of the powder blend, during the rotomolding. The time and temperature used depend upon factors including the thickness of the part being rotomolded and thermal sensitivity of the constituents, and also depend upon the conditions needed for foaming. As applied to a polyethylene base resin and a part thickness of about ⅛" without foaming, an oven temperature setting ranging from about 580° to 600° F. for about 17 to 20 minutes will typically provide sufficient melting and foaming conditions. When an ethylene vinyl ester copolymer such as EVA is used with an acid-released foaming agent, the time and temperature conditions may beneficially provide for the EVA to serve as a proton source.

In the illustrations that follow and throughout this description, all parts and percentages are weight percent unless otherwise specified.

In Table I, the polyolefin base resin is polyethylene having a density of 0.938 gm/cc and a melt index of about 4 gm/10 min, available from Phillips as TR 938. The polymeric additive is ethylene vinyl acetate copolymer containing 9% vinyl acetate, having a density of 0.93 gm/cc, and a melt index of about 9 gm/10 min., available from DuPont as ELVAX 750.

A preblend of the ethylene vinyl acetate copolymer is prepared using a 1:1 ratio of the copolymer to a polyethylene resin having a melt index of 20 gm/10 min and a density of 0.953, available from Mobil. The preblending is carried out by extrusion blending, pelletizing, and grinding the resulting blend to a powder. A preblend is prepared because the copolymer is sticky and difficult to work with.

The desired level of EVA in the base resin is attained by letting down the preblend in the polyethylene base resin in an appropriate proportion. The remaining constituents indicated in Table 1, are added.

TABLE 1

| Run | Foaming Agent | Nucleating Agent | EVA | Foam Density |
|---|---|---|---|---|
| 1 | — | — | — | 60.2 |
| 2 | 0.2% | 0.04% | 1.0% | 45.6 |
| 3 | 0.45 | 0.1 | 2.5 | 20.1 |
| 4 | 0.6 | 0.1 | 3.0 | 13.6 |
| 5 | 0.75 | 0.15 | 3.5 | 10.0 |
| 6 | 1.2 | 0.25 | 4.0 | 7.5 |
| 7 | 1.8 | 0.35 | 5.0 | 6.2 |

Foaming Agent is sodium bicarbonate, and nucleating agent is calcium stearate. Foam density: pounds per cubic foot.

TABLE 2

| Run | Foaming Agent | Nucleating Agent | EVA | Foam Density |
|---|---|---|---|---|
| 1 | 0.3% | CB 0.02% | 1.5% | 28 |
| 2 | 0.6 | CB 0.04 | 3.0 | 11.5 |
| 3 | 0.3 | GP 0.015 | 1.5 | 28.5 |
| 4 | 0.6 | GP 0.03 | 3.0 | 14 |
| 5 | 0.3 | TD 0.1 | 1.5 | 27.8 |
| 6 | 0.6 | TD 0.2 | 3.0 | 12.5 |
| 7 | 0.3 | TC 0.2 | 1.5 | 31.3 |
| 8 | 0.6 | TC 0.4 | 3.0 | 15.2 |
| 9 | 0.3 | IO 0.1 | 1.5 | 32 |
| 10 | 0.6 | IO 0.2 | 3.0 | 15.4 |
| 11 | 0.3 | CS 0.05 | 1.5 | 29.2 |
| 12 | 0.6 | CS 0.1 | 3.0 | 13.6 |

Foaming Agent is sodium bicarbonate. Nucleating Agent is as indicated. CB means carbon black, GP means graphite, TD means titanium dioxide, TC means talc, IO means iron oxide, and CS means calcium stearate. Foam density: pounds per cubic foot.

The foamable powdery mixture is dry blended using a mechanical blender, and rotomolded in a cylindrical mold for about 17 minutes at an oven setting of about 600° F. The rotomolding is on two axes as follows: 12 rpm on axis #1 and 6 rpm on axis #2. After the rotomolding and after cooling, a molded cylinder is removed from the mold. Foam density of molded cylinders is determined by comparative thickness of the cylinder walls.

Run 1 of Table I is comparative. Without foaming, wall thickness is 0.125". Runs 2–7 of Table I are for polyethylene-based compositions in accordance with the present invention. The inner and outer skins of each molded cylinder of runs 2–7 appear to be smooth, and each cylinder has a translucent, flexible outer skin free of bubbles. Foam cells are not interconnected and are of an independent closed cell formation. Thickness of the translucent portion is found to increase with increasing EVA level. Foam density and control of foam density are shown in Table 1.

By comparison, when runs 3 and 6 of Table 1 are repeated using azodicarbonamide in place of sodium bicarbonate, foam cell rupture is observed on the inside of the molded cylinders, causing a rough inside surface. The inside surface from the run 6 repeat is very rough with many lumps and deformation of the inside wall.

Runs 1–12 of Table 2 are for polyethylene-based compositions in accordance with the present invention. A preblend of the ethylene vinyl acetate copolymer in the same carrier resin as before (1:1 ratio), is let down into a polyethylene base resin in an appropriate proportion. The base resin is a polyethylene having a density of 0.938 gm/cc and a melt index of about 3.8 gm/cc, available from Exxon under the designation 8401. The remaining constituents of the foamable composition are added, and the mixture is dry blended using a mechanical blender.

Polyethylene-based compositions constituted as shown in runs 1–12 of Table 2, are rotomolded in a cylindrical mold for about 17 minutes at an oven setting of about 600° F. The rotomolding is on two axes as follows: 12 rpm on axis #1 and 6 rpm on axis #2. After the rotomolding and after cooling, a molded cylinder is removed from the mold.

The inner and outer skins of each molded cylinder appear to be smooth, and each cylinder has a translucent, flexible outer skin free of bubbles. Foam cells are not interconnected and are of an independent closed cell formation. Foam density of each molded cylinder is found to be as indicated in Table 2. Control of foam density using different nucleating agents, is illustrated in Table 2.

The present invention may be carried out with various modifications without departing from the spirit or essential attributes thereof, and accordingly, reference should be made to the appended claims, rather than to the foregoing specification as indicating the scope of the invention.

I claim:

1. A method of molding a foamed hollow article having a closed cell structure and smooth outer skin, said method comprising
    preparing a foamable, polyethylene-based, powder mixture comprising about 0.5 to 7.5 parts by weight of an ester group-bearing, ethylenic polymer having a melt index higher than that of the polyethylene base polymer; an effective amount of a suitable chemical foaming agent; and about 0.01 to 2 parts by weight of a suitable nucleating agent; and
    rotomolding said powder mixture under suitable foaming and melting conditions to provide said foamed hollow article.

2. The method of claim 1, comprising preblending said ester group-bearing, ethylenic polymer with a suitable carrier resin to produce a preblend.

3. The method of claim 2, wherein said preblending comprises extrusion blending said ester group-bearing, ethylenic polymer and said carrier resin; and comprising, after said preblending step, dry blending said polyethylene base polymer, said preblend, said foaming agent and said nucleating agent to produce said powder mixture.

4. The method of claim 1, wherein said ester group-bearing, ethylenic polymer is ethyl vinyl ester copolymer.

5. The method of claim 4, wherein said ethyl vinyl ester copolymer has a vinyl ester content of from about 5 to 25 wt. percent.

6. The method of claim 1, wherein said foaming agent is an inorganic foaming agent.

7. The method of claim 1, wherein said foaming agent is a carbon dioxide-releasing agent.

8. The method of claim 1, wherein said foaming agent is bicarbonate-based, inorganic salt.

9. The method of claim 1, wherein said foaming agent is sodium bicarbonate.

10. The method of claim 1, wherein said polyethylene base polymer has a density in the range of about 0.92 to 0.935 gm/cc.

11. The method of claim 1, wherein said polyethylene base polymer has a density in the range of about 0.935 to 0.96 gm/cc.

12. The method of claim 4, wherein said ethyl vinyl ester copolymer is ethyl vinyl acetate.

13. A method of molding a foamed hollow article having a closed cell structure and smooth outer skin, said method comprising
    preparing a foamable powder mixture comprising a thermoplastic polymer of ethylene selected from the group consisting of an ethylene homopolymer, an ethylene copolymer comprising a C3-C8 alpha-olefin, and mixtures thereof; about 0.5 to 7.5 parts by weight of an ethyl vinyl ester copolymer having a melt index higher than that of said thermoplastic polymer of ethylene; an effective amount of a suitable inorganic chemical foaming agent; and about 0.01 to 2 parts by weight of a suitable nucleating agent having a particle size in the range of from about 0.05 to 50 microns; and
    rotomolding said powder mixture under suitable foaming and melting conditions to provide said foamed hollow article.

14. The method of claim 13, wherein said ethyl vinyl ester copolymer has a vinyl ester content of from about 5 to 25 wt. percent.

15. The method of claim 13, wherein said foaming agent is a carbon dioxide-releasing agent.

16. The method of claim 13, wherein said foaming agent is bicarbonate-based, inorganic salt.

17. The method of claim 13, wherein said thermoplastic polymer of ethylene has a density in the range of about 0.92 to 0.935 gm/cc.

18. The method of claim 13, wherein said thermoplastic polymer of ethylene has a density in the range of about 0.935 to 0.96 gm/cc.

19. The method of claim 13, wherein said ethyl vinyl ester copolymer is ethyl vinyl acetate.

20. A method of molding a foamed hollow article having a closed cell structure and smooth outer skin, said method comprising
    preparing a foamable powder mixture comprising a thermoplastic polymer of ethylene selected from the group consisting of an ethylene homopolymer, an ethylene copolymer comprising a C3-C8 alpha-olefin, and mixtures thereof; about 0.5 to 7.5 parts by weight of ethyl vinyl acetate copolymer having a melt index higher than that of said thermoplastic polymer of ethylene and a vinyl acetate content of from about 5 to 25 wt. percent; an effective amount of a suitable carbon dioxide-releasing, chemical foaming agent; and about 0.01 to 2 parts by weight of a suitable nucleating agent having a particle size in the range of from about 0.05 to 50 microns; and
    rotomolding said powder mixture under suitable foaming and melting conditions to provide said foamed hollow article, whereby said ethyl vinyl acetate copolymer provides said smooth outer skin.

* * * * *